(12) United States Patent
Wang et al.

(10) Patent No.: US 12,388,781 B2
(45) Date of Patent: Aug. 12, 2025

(54) ROUTING INFORMATION MANAGEMENT METHOD FOR A LAYER-3 SWITCH, AND SYSTEM IMPLEMENTING THE SAME

(71) Applicant: Alpha Networks Inc., Hsinchu (TW)

(72) Inventors: Gang Wang, Hsinchu (TW); Xiao Ming Li, Hsinchu (TW); Liang Bing Cao, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 366 days.

(21) Appl. No.: 18/304,130

(22) Filed: Apr. 20, 2023

(65) Prior Publication Data
US 2024/0113996 A1    Apr. 4, 2024

(30) Foreign Application Priority Data
Sep. 30, 2022    (CN) .......................... 202211207541.2

(51) Int. Cl.
*H04L 45/745*    (2022.01)
*H04L 61/103*    (2022.01)

(52) U.S. Cl.
CPC .......... *H04L 61/103* (2013.01); *H04L 45/745* (2013.01)

(58) Field of Classification Search
CPC ...................................... H04L 61/103
USPC ......................................... 370/392
See application file for complete search history.

(56) References Cited

U.S. PATENT DOCUMENTS

| 7,570,647 B2 * | 8/2009 | Miyachi | H04L 61/10 370/395.54 |
| 2017/0041223 A1 | 2/2017 | Akashi | |

FOREIGN PATENT DOCUMENTS

| CN | 103326941 A | 9/2013 | |
| CN | 105812495 A | 7/2016 | |
| CN | 111556179 A * | 8/2020 | ........... H04L 61/103 |
| CN | 114710795 A | 7/2022 | |

OTHER PUBLICATIONS

Search Report appended to an Office Action, which was issued to Taiwanese counterpart application No. 111144116 by the TIPO on Feb. 24, 2023, with an English translation thereof.

* cited by examiner

*Primary Examiner* — Sibte H Bukhari
(74) *Attorney, Agent, or Firm* — Blank Rome LLP

(57) ABSTRACT

A routing information management method adapted for a layer-3 switch is proposed. For each ARP entry in an ARP table, a processor assigns to the ARP entry an aging reference parameter that is identical to a quantity of those routing entries in an IP routing table whose next hop IP addresses are identical to the IP address of the ARP entry, and removes those ARP entries whose aging reference parameters are zero. For each routing entry in the IP routing table, when the next hop IP address of the routing entry is absent from the ARP table, the processor makes the routing entry serve as an inactive routing entry, proactively sends an ARP request for the inactive routing entry, and updates the ARP table based on a piece of ARP information received externally.

16 Claims, 5 Drawing Sheets

| Routing entry | |
|---|---|
| Destination IP address | Next hop IP address |

FIG.2

| ARP entry | |
|---|---|
| IP address | MAC address |

FIG.3

| Unresolved ARP entry | |
|---|---|
| IP address | Reference record time |
| Reference start time | Predetermined time interval |

FIG.4

ROUTING INFORMATION MANAGEMENT METHOD FOR A LAYER-3 SWITCH, AND SYSTEM IMPLEMENTING THE SAME

CROSS-REFERENCE TO RELATED APPLICATION

This application claims priority to Chinese Invention Patent Application No. 202211207541.2, filed on Sep. 30, 2022.

FIELD

The disclosure relates to routing information of a layer-3 switch, and more particularly to a routing information management method for a layer-3 switch, and a system implementing the routing information management method.

BACKGROUND

Conventional layer-3 switches use software, which is executed by a central processing unit (CPU), to compute routing information for maintaining and updating an Internet Protocol (IP) routing table, and use hardware, such as an application specific integrated circuit (ASIC), to perform high-speed route forwarding. The execution of the software can write routing information that is to be used for route forwarding to the CPU, and remove inactive routing information from the CPU.

The routing information can be created by a user or dynamically learned through a routing protocol, and includes a network address information for routing (e.g., a destination IP address for routing) and next hop information (e.g., an IP address of a next hop and a corresponding media access control (MAC) address). When a conventional layer-3 switch receives a message, the conventional layer-3 switch compares a destination IP address contained in the message with all network addresses that are used for routing, and, when finding a matching network address, forwards the message to a node device that is close to the layer-3 switch in the network. The node device receiving the forwarded message is called the next hop on the route, and is connected to the layer-3 switch through an IP interface.

The process of forwarding the message to the next hop on the route is based on an IP address and a MAC address of the next hop (namely, next hop information), which can be obtained through an address resolution protocol (ARP). In practice, the next hop information is not stable in terms of validity. For example, a change in the status of the node device or a disconnection between the layer-3 switch and the node device may result in loss of the next hop information. In addition, the ARP mechanism usually requires removing all dynamically learned ARP information from a temporary storage module (e.g., an ARP cache) periodically (e.g., every 300 seconds), which is called ARP aging, so that the temporary storage module will not be occupied by too many invalid ARP information, thereby achieving efficient use of the storage resources. However, such kind of ARP aging may also cause undesired loss of valid ARP information. When the ARP information of the next hop is absent for a route, the route cannot be used to forward messages, and thus becomes an inactive route, which will be removed from a hardware routing table that is stored in a chip (e.g., the abovementioned ASIC) of the layer-3 switch.

The conventional layer-3 switch will be triggered to retrieve the ARP information that has been lost when receiving a data message that is to be forwarded through a route having a next hop that corresponds to the lost ARP information. Such a mechanism to retrieve the ARP information is called data trigger. The CPU of the conventional layer-3 switch will look into a software routing table based on the received data message, and, when a matching route is found from the software routing table, broadcast an ARP request in a virtual local area network (VLAN) that corresponds to the matching route in order to learn the ARP information that corresponds to the next hop on the matching route. Upon receipt of an ARP response from the node device, the conventional layer-3 switch learns the ARP information that corresponds to the next hop, and thus is able to perform hardware forwarding on the data message again.

However, before re-learning the ARP information corresponding to the next hop, if the conventional layer-3 switch continuously receives messages to be forwarded through the route, the CPU may continuously perform the abovementioned operations for each of those messages. A great number of such messages may result in heavy loads for the CPU, and thus adversely affect normal operation of the conventional layer-3 switch.

SUMMARY

Therefore, an object of the disclosure is to provide a method and a system that can alleviate at least one of the drawbacks of the prior art.

According to the disclosure, a routing information management method adapted for a layer-3 switch is provided to be implemented by a processor. The layer-3 switch is coupled to a plurality of node devices through a network, and stores an IP routing table and an ARP table. The IP routing table records a plurality of routing entries, each including a destination IP address and a next hop IP address. The ARP table records a plurality of ARP entries, each including an IP address and an MAC address of one of the node devices that corresponds to the IP address. The routing information management method includes steps of: determining, for each of the ARP entries in the ARP table, a quantity of those of the routing entries in the IP routing table whose next hop IP addresses are identical to the IP address of the ARP entry, and assigning an aging reference parameter that is identical to the quantity thus determined to the ARP entry; removing those of the ARP entries whose aging reference parameter thus assigned are zero from the ARP table during an aging process of the ARP table; determining, for each of the routing entries in the IP routing table, whether the next hop IP address of the routing entry is present in the ARP table, and making the routing entry serve as an inactive routing entry when determining that the next hop IP address of the routing entry is absent from the ARP table; proactively sending an ARP request for the inactive routing entry to the network; and updating the ARP table based on a piece of ARP information received through the network.

In some embodiments, the ARP information contains an IP address and a MAC address corresponding to the IP address, and the step of updating the ARP table includes adding a new ARP entry to the ARP table, where the new ARP entry includes the IP address and the MAC address that are contained in the ARP information.

In some embodiments, the step of proactively sending the ARP request includes: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and, when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

In some embodiments, the step of proactively sending the ARP request further includes: determining whether a time period between a current time and the reference record time of the unresolved ARP entry has exceeded a predetermined length of time; and, upon determining that the time period has exceeded the predetermined length of time, updating the predetermined time interval of the unresolved ARP entry to be longer.

In some embodiments, the routing information management method further includes a step of removing the unresolved ARP entry whose IP address is contained in the ARP information from the unresolved ARP list.

According to the disclosure, a routing information management system adapted for a layer-3 switch is provided. The layer-3 switch is coupled to a plurality of node devices through a network. The routing information management system includes a storage module and a processor. The storage module stores an IP routing table and an ARP table. The IP routing table records a plurality of routing entries, each including a destination IP address and a next hop IP address. The ARP table records a plurality of ARP entries, each including an IP address and an MAC address of one of the node devices that corresponds to the IP address. The processor is coupled to the storage module and the network, and is configured to perform the routing information management method according to this disclosure.

In some embodiments, the ARP information contains an IP address and a MAC address corresponding to the IP address, and the processor is configured to update the ARP table by adding a new ARP entry to the ARP table, where the new ARP entry includes the IP address and the MAC address that are contained in the ARP information.

In some embodiments, the processor is configured to proactively send the ARP request by: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

In some embodiments, the processor is further configured to determine whether a time period between a current time and the reference record time of the unresolved ARP entry has exceeded a predetermined length of time, and to, upon determining that the time period has exceeded the predetermined length of time, update the predetermined time interval of the unresolved ARP entry to be longer.

In some embodiments, the processor is configured to remove the unresolved ARP entry whose IP address is contained in the ARP information from the unresolved ARP list.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 2 is a table illustrating some content of a routing entry in accordance with some embodiments of this disclosure.

FIG. 3 is a table illustrating some content of an ARP entry in accordance with some embodiments of this disclosure.

FIG. 4 is a table illustrating some content of an unresolved ARP entry in accordance with some embodiments of this disclosure.

DETAILED DESCRIPTION

Figure 1:
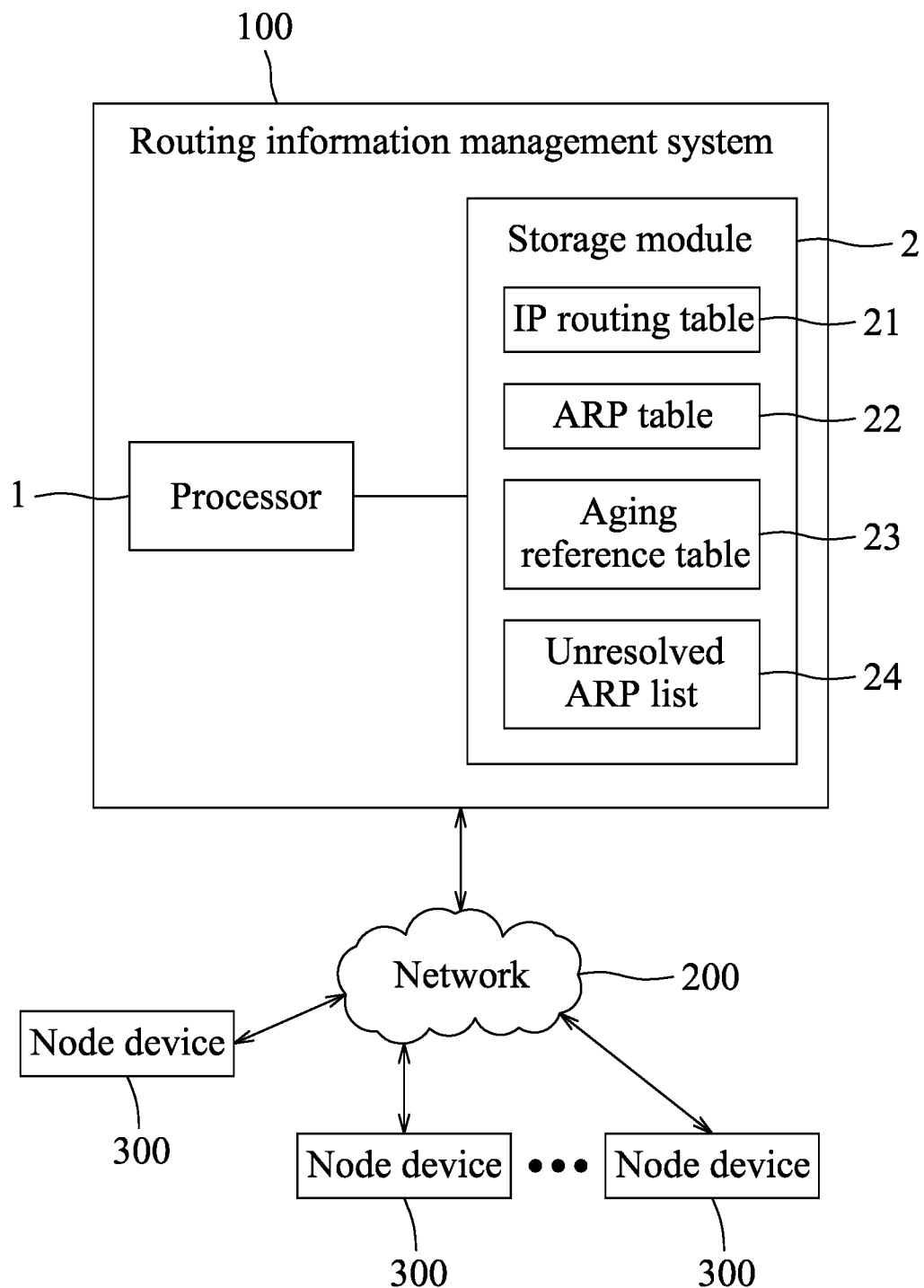
FIG. 1 is a block diagram illustrating architecture of a routing information management system in accordance with some embodiments of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 and 2, an embodiment of a routing information management system 100 according to this disclosure is illustrated. The routing information management system 100 is adapted to be implemented in a layer-3 switch that is coupled to a plurality of node devices 300 through a network 200, such as a local area network (LAN). Specifically, the routing information management system 100 is used to manage information related to a next hop on a route of the layer-3 switch, and includes a processor 1 and a storage module 2 that are connected to each other. In this embodiment, the storage module 2 may be realized as one or more memory components (e.g., cache memory), and the processor 1 may be realized as a central processing unit (CPU) of the layer-3 switch, and is connected to the network 200 through a communication interface (not shown).

In this embodiment, the storage module 2 stores an Internet Protocol (IP) routing table 21, an address resolution protocol (ARP) table 22, an aging reference table 23 and an unresolved ARP list 24. The IP routing table 21 records a plurality of routing entries that are acquired by the processor 1 through, for example, a routing protocol. As illustrated in FIG. 2, each routing entry corresponds to a route, and includes a destination IP address and a next hop IP address that correspond to the route. The ARP table 22 records a plurality of ARP entries that are acquired by the processor 1. As illustrated in FIG. 3, each ARP entry includes an IP address and a medium access control (MAC) address of one of the node devices 300 that corresponds to the IP address. The aging reference table 23 is related to an aging process to be performed on the ARP table 22, and records aging reference parameters that are assigned to the ARP entries of the ARP table 22, respectively. In some embodiments, the aging reference table 23 may be incorporated into the ARP table 22. The unresolved ARP list 24 records information relevant to inactive routing entries in the IP routing table 21.

Figure 5:
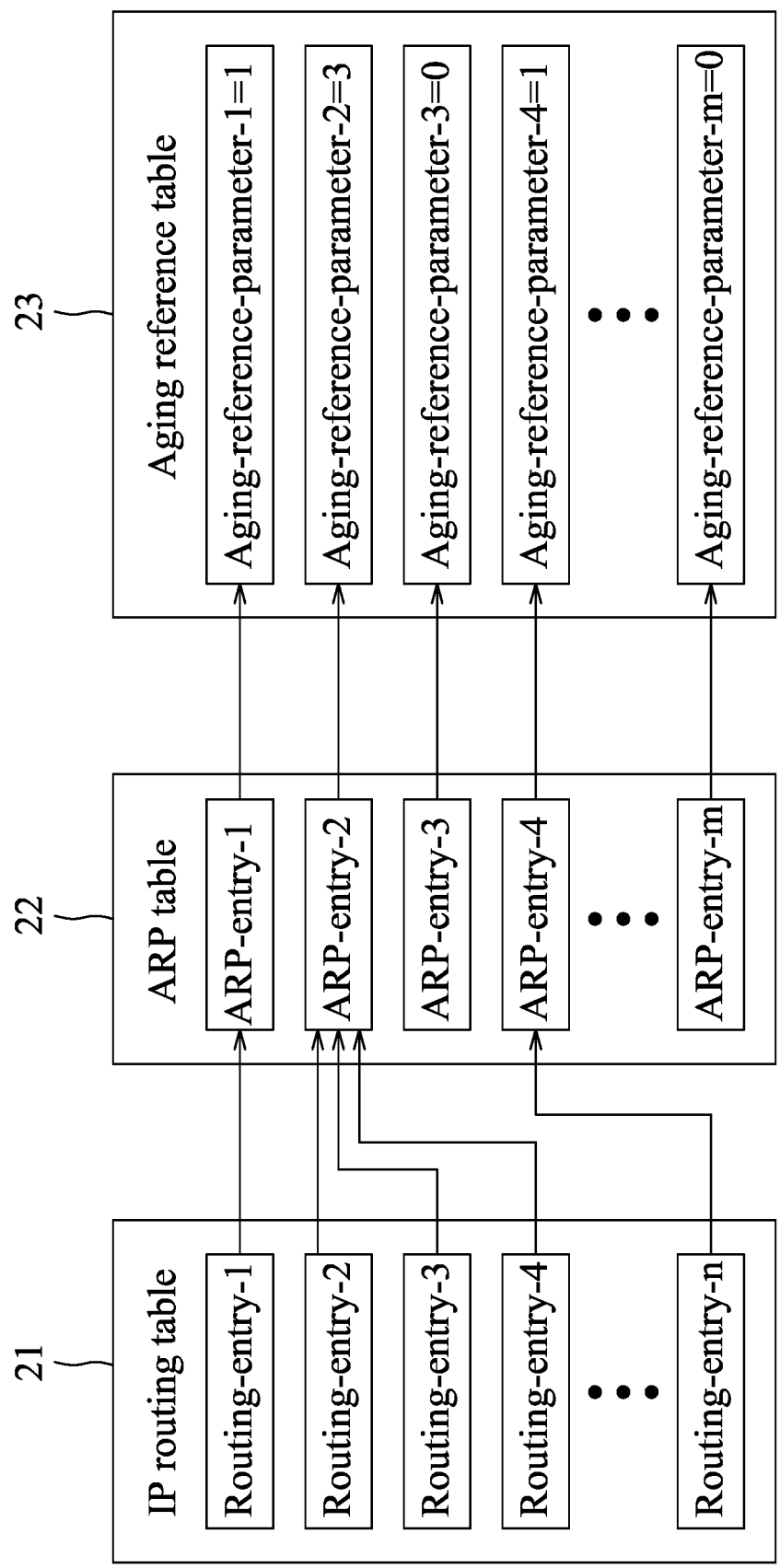
FIG. 5 is a block diagram illustrating relationships among an IP routing table, an ARP table and an aging reference table in accordance with some embodiments of this disclosure.

FIG. 5 provides an example illustrating how the processor 1 determines the aging reference table 23 based on the IP routing table 21 and the ARP table 22. In this example, the IP routing table 21 records n number of routing entries (namely, routing-entry-1 to routing-entry-n), and the ARP table 22 stores m number of ARP entries (namely, ARP-entry-1 to ARP-entry-m), where m<n, but this disclosure is not limited in this respect. For each ARP entry in the ARP table 22, the processor 1 determines a quantity of those of the routing entries in the IP routing table 21 whose next hop IP addresses are identical to the IP address of the ARP entry, assigns an aging reference parameter that is identical to the quantity thus determined to the ARP entry, and records the aging reference parameter that corresponds to the ARP entry in the aging reference table 23. In FIG. 5, the IP address of the ARP-entry-1 is identical only to the next hop IP address of routing-entry-1, so the aging reference parameter assigned or corresponding to ARP-entry-1 is equal to one; the IP address of ARP-entry-2 is identical to the next hop IP addresses of routing-entry-2 to the routing-entry-4, so the aging reference parameter assigned or corresponding to ARP-entry-2 is equal to three; and the IP address of ARP-entry-3 is different from the next hop IP addresses of all of the routing entries, so the aging reference parameter assigned or corresponding to ARP-entry-3 is equal to zero. The aging reference parameters assigned or corresponding to ARP-entry-4 to ARP-entry-m can be derived based on the abovementioned rule, so details thereof are not repeated herein.

Figure 7:
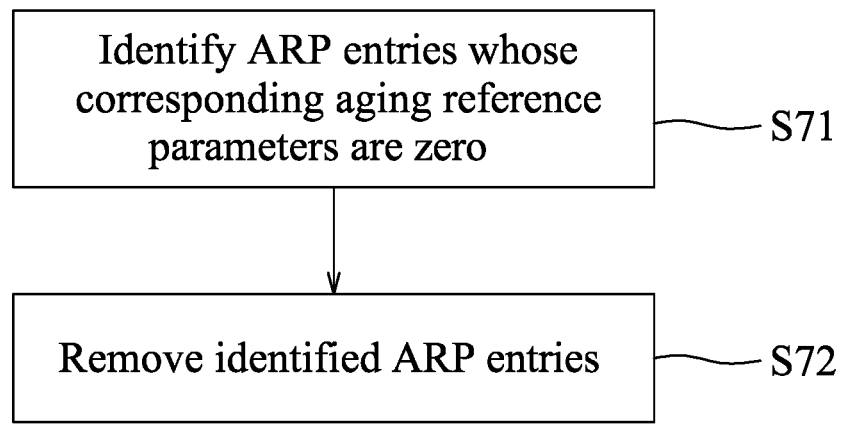
FIG. 7 is a flow chart illustrating steps of an aging process in accordance with some embodiments of this disclosure.
Figure 8:
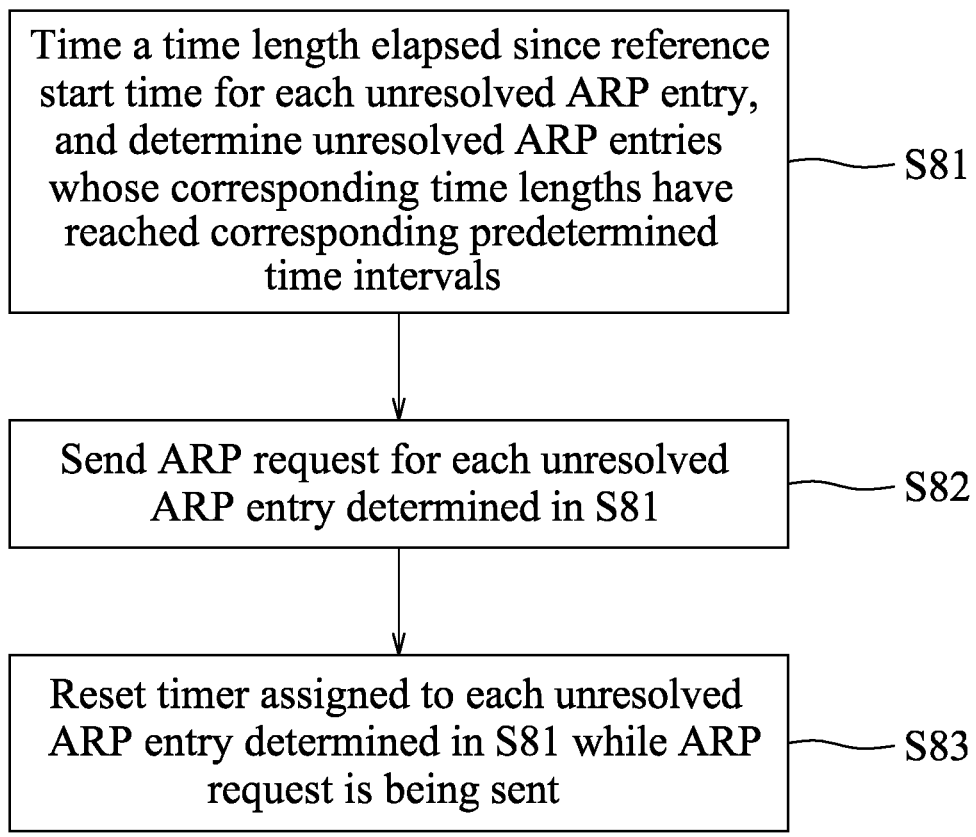
FIG. 8 is a flow chart illustrating steps of a method for proactively sending an ARP request for an inactive routing entry in accordance with some embodiments of this disclosure.

Referring to FIGS. 1, 5 and 7, this disclosure provides an aging process to be performed on the ARP table 22. In some embodiments, the processor 1 performs the aging process based on the aging reference table 23 stored in the storage module 2. The aging process includes step S71 and S72, which may be performed periodically. In step S71, the processor 1 identifies those of the ARP entries (e.g., ARP-entry-3 and ARP-entry-m in FIG. 5) whose corresponding aging reference parameters in the aging reference table 23 are zero (e.g., aging-reference-parameter-3 and aging-reference-parameter-m in FIG. 5). In step S72, the processor 1 removes those of the ARP entries identified in step S71 from the ARP table 22, so as to ensure effective use of memory resources, and to prevent ARP information from being lost in a conventional aging process where stored ARP entries will be indiscriminately removed periodically.

Figure 6:
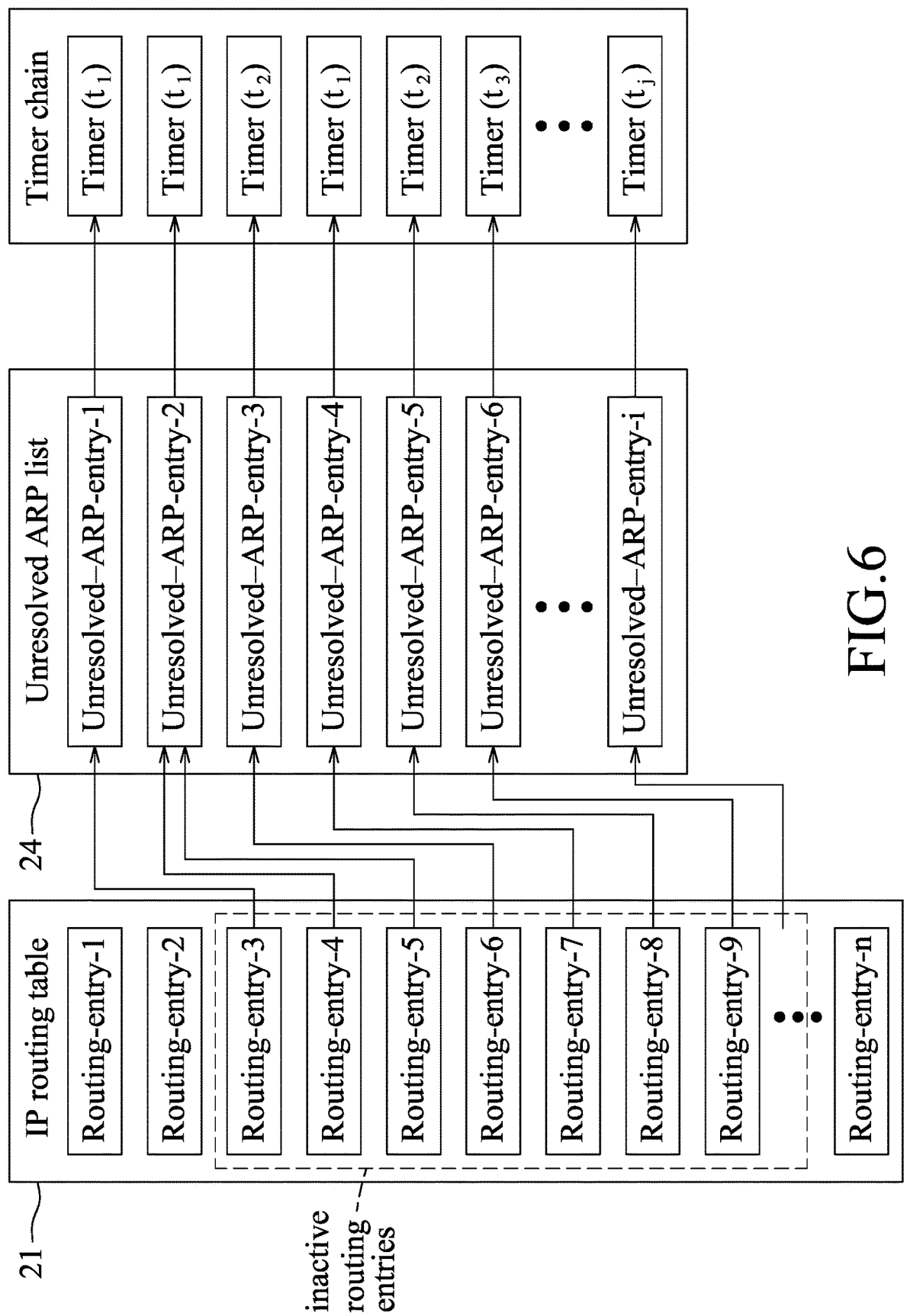
FIG. 6 is a block diagram illustrating relationships among the IP routing table, an unresolved ARP list, and timers of a timer chain in accordance with some embodiments of this disclosure.

This disclosure further provides a method for proactively or automatically sending an ARP request for an inactive routing entry rather than the conventional data trigger mechanism where an ARP request is sent passively in response to receipt of a data message to be forwarded through a route having a next hop that corresponds to lost ARP information. In this embodiment, since the proactive sending of the ARP request is based on information in the unresolved ARP list 24, the processor 1 would check the unresolved ARP list 24 prior to proactively sending the ARP request. In the beginning, for each of the routing entries in the IP routing table 21, the processor 1 determines whether the next hop IP address of the routing entry is present in the ARP table 22 (i.e., whether the next hop IP address of the routing entry is the IP address of one of the ARP entries in the ARP table 22), and makes the routing entry serve as an inactive routing entry when determining that the next hop IP address of the routing entry is absent from the ARP table 22. For example, in a case where the next hop IP address of each of routing-entry-3 to routing-entry-9 is absent from the ARP table 22, the processor 1 makes each of routing-entry-3 to routing-entry-9 serve as an inactive routing entry, and records, for the next hop IP address of each of routing-entry-3 to routing-entry-9 (i.e., the inactive routing entries), an unresolved ARP entry that corresponds to the next hop IP address of the inactive routing entry in the unresolved ARP list 24, as illustrated in FIG. 6, where the unresolved ARP list 24 records i number of unresolved ARP entries (namely, unresolved-ARP-entry-1 to unresolved-ARP-entry-i, where i≤n). It is noted that multiple inactive routing entries may have the same next hop IP address. In the illustrative example, routing-entry-4 and routing-entry-5 have the same next hop IP address, and thus correspond to the same unresolved ARP entry (i.e., unresolved-ARP-entry-2). Further referring to FIG. 4, each unresolved ARP entry includes an IP address that is identical to the next hop IP address of the corresponding inactive routing entry or entries, a reference record time at which the unresolved ARP entry was recorded in the unresolved ARP list 24 by the processor 1, a reference start time, and a predetermined time interval. The reference start time serves as a start of a timing operation, is identical to a latest time point the ARP request was sent for the unresolved ARP entry, and is initially set to the reference record time. The predetermined time interval is a time length the ARP request is to be re-sent since the reference start time, and is set as, for example, ten seconds in this embodiment (i.e., the processor 1 will send the ARP request ten seconds after the reference start time), but this disclosure is not limited in this respect.

Hereinafter, FIGS. 1, 4, 6 and 8 are used to cooperatively illustrate a procedure for proactively sending the ARP request.

In step S81, for each unresolved ARP entry in the unresolved ARP list 24, the processor 1 times a time length elapsed since the reference start time of the unresolved ARP entry. In practice, the processor 1 may assign timers of a timer chain provided by a software executed by the processor 1 respectively to the unresolved ARP entries in the unresolved ARP list 24, and use the timers to time the time lengths that respectively correspond to the unresolved ARP entries. In FIG. 6, unresolved-ARP-entry-1, unresolved-ARP-entry-2, and unresolved-ARP-entry-4 have the same reference start time $t_1$ (i.e., the start point of timing for the timers assigned to unresolved-ARP-entry-1, unresolved-ARP-entry-2, and unresolved-ARP-entry-4), unresolved-ARP-entry-3 and unresolved-ARP-entry-5 have the same reference start time $t_2$ (i.e., the start point of timing for the timers assigned to unresolved-ARP-entry-3 and unresolved-ARP-entry-5), unresolved-ARP-entry-6 has a reference start time $t_3$ (i.e., the start point of timing for the timer assigned to unresolved-ARP-entry-6), and unresolved-ARP-entry-i has a reference start time $t_j$ (i.e., the start point of timing for the timer assigned to unresolved-ARP-entry-i, where j<i). For each unresolved ARP entry, the processor 1 checks whether the time length elapsed since the corresponding reference start time has reached the predetermined time interval of the unresolved ARP entry based on a timing result of the corresponding one of the timers of the timer chain, so that the processor 1 can determine those of the unresolved ARP entries that correspond to those of the timers whose timing results have reached the (corresponding) predetermined time intervals.

In step S82, for each of those of the unresolved ARP entries determined in step S81 (i.e., those of the unresolved ARP entries the time lengths timed therefor have reached the corresponding predetermined time intervals), the processor 1 generates an ARP request based on the IP address of the unresolved ARP entry (i.e., the ARP request includes at least the IP address of the unresolved ARP entry), and sends (e.g., in a manner of broadcasting) the ARP request to the network 200. For example, when determining that the time length timed for unresolved-ARP-entry-1, unresolved-ARP-entry-2, and unresolved-ARP-entry-4 (i.e., the timing results of the timers assigned to unresolved-ARP-entry-1, unresolved-ARP-entry-2, and unresolved-ARP-entry-4) in FIG. 6 have reached the corresponding predetermined intervals (e.g., ten seconds), respectively, the processor 1 will send multiple ARP requests respectively for unresolved-ARP-entry-1, unresolved-ARP-entry-2, and unresolved-ARP-entry-4, where each of the ARP requests includes the IP address of the corresponding one of unresolved-ARP-entry-1, unresolved-ARP-entry-2, and unresolved-ARP-entry-4.

In step S83, for each of those of the unresolved ARP entries determined in step S81, the processor 1 updates, when sending the corresponding ARP request, the reference start time to be a time the corresponding ARP request is sent. In other words, when sending the ARP request for an unresolved ARP entry, the processor 1 may reset the timer assigned to the unresolved ARP entry, and the timer restarts to time the time length from zero. Following the aforesaid example, the processor 1 may update the reference start time of each of unresolved-ARPentry-1, unresolved-ARPentry-2, and unresolved-ARPentry-4 in FIG. 6 from t1 to t1', which represents the time the corresponding ARP requests were sent in step S82.

When the processor 1 receives through the network 200 a piece of ARP information that is sent by an external device in response to an ARP request, the processor 1 updates the ARP table 22 and the unresolved ARP list 24 based on the piece of ARP information. In detail, the ARP information may include the IP address contained in the ARP request, and a MAC address corresponding to the IP address, so the processor 1 updates the ARP table 22 by adding a new ARP entry that includes the IP address and the MAC address contained in the ARP information to the ARP table 22. Meanwhile, the processor 1 removes the unresolved ARP entry that includes the IP address contained in the ARP information from the unresolved ARP list 24.

In this embodiment, the processor 1 may repeat steps S81-S83 every time a predetermined period has elapsed. In order to efficiently send the ARP requests, for each of the unresolved ARP entries, the processor 1 may periodically (e.g., at intervals of the predetermined period) determine whether a time period between a current time and the reference record time of the unresolved ARP entry has exceeded a predetermined length of time (e.g., thirty seconds, fifty seconds, etc.). Upon determining that the time period has exceeded the predetermined length of time, the processor 1 updates the predetermined time interval of the unresolved ARP entry to be longer, so as to reduce a number of times of transmitting the ARP request for an unresolved ARP entry that requires longer time to learn the relevant ARP information.

In summary, the embodiment of the routing information management system 100 according to this disclosure has the following effects:

1. Since the processor 1 performs the aging process on the ARP table 24 based on the aging reference parameters, the ARP entries that are currently in use will not be deleted, unlike the conventional aging process which would indiscriminately remove the ARP entries periodically (e.g., every 300 seconds) in the conventional aging process, and the number of times of sending the ARP requests can thus be reduced.

2. The processor 1 proactively sends ARP requests for the unresolved ARP entries to acquire the corresponding ARP information. In comparison to the conventional technique where the CPU retrieves the ARP information by data trigger, which may occupy a lot of CPU resources when a large amount of data messages that correspond to lost ARP information are received in a short time, the embodiment can significantly reduce the use of the CPU resources, so as to ensure the stability in terms of system performance.

3. The use of the unresolved ARP list 24 assists the processor 1 in efficiently sending the ARP requests.

4. The proposed method of proactively sending the ARP requests may be applicable to some scenarios where the layer-3 switch is connected to some devices with simple functions (e.g., IP cameras), and needs to learn ARP information of the devices in advance to communicating with the devices.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A routing information management method adapted for a layer-3 switch that is coupled to a plurality of node devices through a network, and implemented by a processor, the layer-3 switch storing an Internet Protocol (IP) routing table and an address resolution protocol (ARP) table, the IP routing table recording a plurality of routing entries, each including a destination IP address and a next hop IP address, the ARP table recording a plurality of ARP entries, each including an IP address and a medium access control (MAC) address of one of the node devices that corresponds to the IP address, said routing information management method comprising steps of: determining, for each of the ARP entries in the ARP table, a quantity of those of the routing entries in the IP routing table whose next hop IP addresses are identical to the IP address of the ARP entry, and assigning an aging reference parameter that is identical to the quantity thus determined to the ARP entry; removing those of the ARP entries whose aging reference parameter thus assigned are zero from the ARP table during an aging process of the ARP table; determining, for each of the routing entries in the IP routing table, whether the next hop IP address of the routing entry is present in the ARP table, and making the routing entry serve as an inactive routing entry when determining that the next hop IP address of the routing entry is absent from the ARP table; proactively sending an ARP request for the inactive routing entry to the network; and updating the ARP table based on a piece of ARP information received through the network.

2. The routing information management method as claimed in claim 1, wherein the ARP information contains an IP address and a MAC address corresponding to the IP address, and the step of updating the ARP table includes adding a new ARP entry to the ARP table, where the new ARP entry includes the IP address and the MAC address that are contained in the ARP information.

3. The routing information management method as claimed in claim 2, wherein the step of proactively sending the ARP request includes: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

4. The routing information management method as claimed in claim 3, wherein the step of proactively sending the ARP request further includes: determining whether a time period between a current time and the reference record time of the unresolved ARP entry has exceeded a predetermined length of time; and upon determining that the time period has exceeded the predetermined length of time, updating the predetermined time interval of the unresolved ARP entry to be longer.

5. The routing information management method as claimed in claim 3, further comprising a step of: removing the unresolved ARP entry whose IP address is contained in the ARP information from the unresolved ARP list.

6. The routing information management method as claimed in claim 1, wherein the step of proactively sending the ARP request includes: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

7. The routing information management method as claimed in claim 6, wherein the step of proactively sending the ARP request further includes: determining whether a time period between a current time and the reference record time of the unresolved ARP entry has exceeded a predetermined length of time; and upon determining that the time period has exceeded the predetermined length of time, updating the predetermined time interval of the unresolved ARP entry to be longer.

8. The routing information management method as claimed in claim 6, further comprising a step of: removing the unresolved ARP entry whose IP address is contained in the ARP information from the unresolved ARP list.

9. A routing information management system adapted for a layer-3 switch that is coupled to a plurality of node devices through a network, comprising:
a processor that is coupled to a storage module and the network, and that is configured to perform the routing information management method as claimed in claim 1 and further comprising;
a storage module that stores an Internet Protocol (IP) routing table and an address resolution protocol (ARP) table,
the IP routing table recording a plurality of routing entries, each including a destination IP address and a next hop IP address,
the ARP table recording a plurality of ARP entries, each including an IP address and a medium access control (MAC) address of one of the node devices that corresponds to the IP address.

10. The routing information management system as claimed in claim 9, wherein the ARP information contains an IP address and a MAC address corresponding to the IP address, and said processor is configured to update the ARP table by adding a new ARP entry to the ARP table, where the new ARP entry includes the IP address and the MAC address that are contained in the ARP information.

11. The routing information management system as claimed in claim 10, wherein said processor is configured to proactively send the ARP request by: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

12. The routing information management system as claimed in claim 11, wherein said processor is further configured to determine whether a time period between a current time and the reference record time of the unresolved ARP entry has exceeded a predetermined length of time, and to, upon determining that the time period has exceeded the predetermined length of time, update the predetermined time interval of the unresolved ARP entry to be longer.

13. The routing information management system as claimed in claim 11, wherein said processor is configured to remove the unresolved ARP entry whose IP address is contained in the ARP information from the unresolved ARP list.

14. The routing information management system as claimed in claim 9, wherein said processor is configured to proactively send the ARP request by: recording an unresolved ARP entry that corresponds to the inactive routing entry in an unresolved ARP list, the unresolved ARP entry including an IP address that is identical to the next hop IP address of the inactive routing entry, a reference record time at which the unresolved ARP entry was recorded, a reference start time, and a predetermined time interval; timing a time length elapsed since the reference start time for the unresolved ARP entry; and when the time length thus timed for the unresolved ARP entry has reached the predetermined time interval of the unresolved ARP entry, sending the ARP request to the network based on the IP address of the unresolved ARP entry, and updating the reference start time to be a time the ARP request was sent.

15. The routing information management system as claimed in claim 14, wherein said processor is further configured to determining whether a time period between a current time and the reference record time of the unresolved ARP entry has exceeded a predetermined length of time, and to, upon determining that the time period has exceeded the predetermined length of time, update the predetermined time interval of the unresolved ARP entry to be longer.

16. The routing information management system as claimed in claim 14, wherein said processor is configured to remove the unresolved ARP entry whose IP address is contained in the ARP information from the unresolved ARP list.

\* \* \* \* \*